Oct. 20, 1942.    R. A. COFFMAN    2,299,464
POWER GENERATING UNIT
Filed Dec. 14, 1931    3 Sheets-Sheet 1

Fig. 1ª.

Inventor
ROSCOE A. COFFMAN,
By Shepherd & Campbell
Attorneys

Oct. 20, 1942.   R. A. COFFMAN   2,299,464
POWER GENERATING UNIT
Filed Dec. 14, 1931   3 Sheets-Sheet 2

Inventor
ROSCOE A. COFFMAN,
By Shepherd & Campbell
Attorneys

Oct. 20, 1942.   R. A. COFFMAN   2,299,464
POWER GENERATING UNIT
Filed Dec. 14, 1931   3 Sheets-Sheet 3

ROSCOE A. COFFMAN, Inventor

By Stephen Campbell
Attorneys

UNITED STATES PATENT OFFICE 2,299,464

POWER GENERATING UNIT

Roscoe A. Coffman, Pittsburgh, Pa.

Application December 14, 1931, Serial No. 581,032

21 Claims. (Cl. 102—12)

This invention relates to a pressure creating unit and method of applying the same. A device of this general character is illustrated in my copending application Serial No. 536,389, filed May 11, 1931, now Patent No. 2,005,913, where there is disclosed a cartridge for generating pressure to be utilized in an expansion motor for internal combustion engine starters. While the cartridge of the present invention is of utility in the same relation, I wish to make it clear at the out-set that it is by no means limited to that particular field, but that it has a wide range of applicability, and that it is intended to be used in any relation where a self-contained pressure generating unit may be employed to advantage. Therefore, merely as a means of bringing out certain characteristics of the device, I have illustrated in the accompanying drawings a part of the system disclosed in my application aforesaid, but it is to be understood that this is not to be construed as limiting with respect to the uses to which the invention may be put, nor necessarily as a part of the invention.

The major object of this invention is to provide a small portable unit assembly capable of generating within a closed system a sufficient volume of gases and superheating the same to a maximum of expansion to pressures sufficiently low to be accurately controlled but great enough to, within a limited space, develop a preponderance of horsepower sufficiently great to perform a given amount of useful work when used in connection with a device adapted to receive the same.

Another object of the invention is to provide in such unit assembly a fuel capable of generating gases and superheating same at a predetermined rate sufficiently rapid to perform the determined work operation, yet sufficiently slow to avoid injurious shock to the device or mechanisms to which the resulting power is transmitted.

A further object of the invention is to provide a fuel sufficiently slow burning as to be capable when ignited of propelling a major portion of the fuel contained in the unit to a point remote to the initial point of ignition and there burned to maintain the necessary pressure.

Another object resides in the construction of the unit whereby provision is made so that after the igniting means is ignited, the pressure, prior to the opening of the unit for release of the fuel to permit its passage to the remote point, will not be so great as to snuff out the flames of the slow burning fuel.

Another object is to provide in such unit a non-detonating igniting means producing a flame of sufficient duration and heat to insure the ignition and combustion of the fuel within said unit.

A still further object of the invention is to provide a closure for said unit of such nature that it will not only effectively close the unit against moisture as well as retain the fuel in the unit, but when the fuel is ignited will also ignite and be completely consumed adding to the volume of gases and heat produced by said unit, and of such flexible construction as to permit passage of such closure element through a restricted cross-sectional area of approximately one-fifth the cross-sectional area of the shell.

Another object is to provide a closure element having an annular flange adapted, when in normal or loaded position, to be effectively locked in position by the crimp walls of the cartridge unit.

Another object is to provide in the rear of the unit an insulator such as asbestos for the purpose of preventing the escape of heat and gases generated by the fuel when the unit is used in a closed system.

Another object resides in the safety feature of the base disc wherein is incorporated an aperture normally covered by a substance breakable by the insertion of the electrical contact means.

Another object of the invention resides in the safety features for which provision is made in the base of the shell in that the exterior base element is apertured to prevent an electric contact from the metal parts of the system, and it is also covered with a breakable film to prevent moisture and dirt gathering in said aperture.

A still further object of the invention is to prevent leakage of gas from the shell through the safety aperture, and this by offsetting the lead wires of the electrically ignited hot flash device from said safety aperture.

In the accompanying drawing

Fig. 1a is an end elevation of the cylinder shown in Fig. 1.

Figures 9 and 10 are vertical sectional views through modified forms of shells, while

Like numerals designate corresponding parts in all the figures of the drawings.

Figure 2:
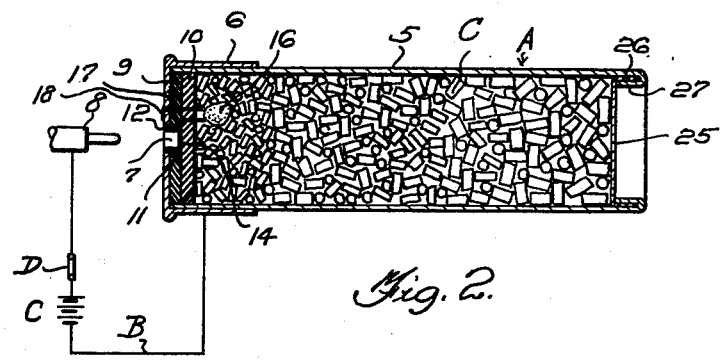
Fig. 2 is a vertical section of a shell constituting one form of pressure creating element constructed in accordance with the invention.
Figure 3:
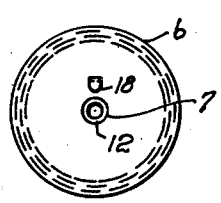
Fig. 3 is an end elevational view of said shell.
Figure 4:
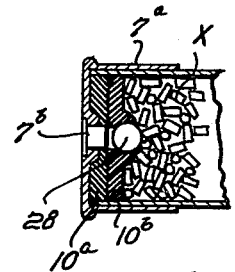
Fig. 4 is a sectional view illustrating a modified form of shell hereinafter described.

In the particular embodiment of the invention illustrated in Fig. 2, A designates a shell comprising a tubular member 5 of cartridge paper or any other suitable material, and a ferrule 6 crimped thereon in a known way.

This ferrule is provided with a central opening 7 adapted to receive a circuit completing pin 8. Disks 9 and 10 of insulating material are located in the bottom of the shell, and the disk 9 is provided with a safety aperture 11 which aligns with the central opening of the ferrule. A sleeve of insulating material, indicated at 12, is received within these openings and serves to prevent accidental contact of the pin 8 with the metal of the ferrule. A contact strip 14 is disposed between the disks 9 and 10, and a fine bridge wire leads therefrom through a match head composition 16, said bridge wire being continued in the form of a metallic strip 17 back to the ferrule, said strip being bent into engagement with said ferrule, as at 18. It is clear, therefore, that if a shell of this character be placed in a grounded breech block, such as that indicated at 19, in Fig. 1, said ferrule is thus included in a circuit diagrammatically illustrated at B in Fig. 2, and the match head 16 will be ignited when the pin 8 is thrust inwardly to contact with strip 14, the circuit being then completed from the source of E. M. F. indicated at C from pin 8 through strip 14, match head 16 and ferrule 6, back to the grounded side of the circuit, or in other words, to the breech block.

The circuit preferably includes a switch, indicated at D, so that after the shell has been placed in the breech block the pin 8 may be moved into contact with strip 14 and left in contact with the switch D open. This provides means for distant control of the shell, it being apparent that the match head will be ignited under these conditions, when the switch is closed, either manually or automatically.

The body 5 of the shell contains a burnable, non-explosive pressure generating fuel C and it is in the characteristics of this fuel that part of the novelty of the present invention resides. The form of fuel which I have found to be highly efficient in accomplishing the objects sought, consists of grains of nitrocellulose fuel of such size and/or construction and/or relative proportions of sizes as to produce a fuel which, when ignited by the match head, will burn rapidly and generate a very considerable volume of usable propulsive gases without detonation, shock, or jar. I find that by suitably proportioning the sizes of the grains used or by varying the construction of said grains (as for example by piercing them with a greater or less number of small holes) I can control the rate of burning very accurately, and under the present invention I do so control the rate of burning as to discharge from the shell a large quantity of heated gases together with such quantity of the fuel as to carry on combustion and maintain and/or progressively increase the heat volume and pressure of the gases over a desired length of time but without explosion, shock, or jar, without detonation.

Further, I vary the rate of combustion of some of the grains with respect to the rate of combustion of other of the grains, so that the gas from the first burned grains may serve to quickly build up a desired pressure and heat surfaces in contact with which the gases are to come, and the slower burning grains will thereafter maintain the heat of these gases and cause their continued expansion for the performance of the desired work.

A further important point of novelty inherent in the present invention is that under certain desired conditions I so arrange the rate of burning of the fuel within the shell 5 that the portion of the fuel first ignited generates sufficient gas before the ignition of the last of the fuel, that any desired part of the fuel is propelled, before being ignited or before being burned, from the shell, and to another point where useful work is to be done and there ignited and burned. A shell having the latter characteristics is of particular utility in connection with the structure of Fig. 1 where 20 designates a combustion chamber to which the gases discharged from the shell, along with the unconsumed fuel are conducted through a tube 21, from the discharge nozzle 22 of the breech block.

It will be observed that the tube 21 constitutes a path of some considerable length and consequently this tube serves as a reservoir within which a considerable volume of gas is generated prior to the time that a piston 23 within the cylinder 24 and upon which the gases are designed to act, begins to move, so that after the piston begins to move there will be a sufficient volume of gas already created to carry out the desired action of the piston. I have found that the position of the match head 16 in the shell largely determines the amount of fuel which will be consumed within the shell, and the amount which will be propelled from the shell to another point to be consumed at the latter point. That is to say, by locating the match head 16 nearer the front of shell 5 (and this may be accomplished by merely extending the wires leading to said match head) more of the fuel will be consumed within the shell and discharged therefrom as gas and less will be propelled from the shell in unburned form.

The fuel is held in place within the shell by a cap 25. This cap is made of a burnable material, such for example as a nitrocellulose film; said cap being provided with an out-turned annular flange or edge 26 over which the end of the shell 5 is crimped as indicated at 27. This provides a water and moisture proof seal which will be completely consumed along with the remainder of the fuel. While I have described the cap as consisting of a nitrocellulose film; I wish it to be understood that I contemplate the use of any material of a character of yielding sufficient oxygen to support its own combustion and one which will be consumed with substantially no residue and of substantially the same flexibility as a nitrocellulose film cap.

One of the important advantages of the cartridge described is that it functions with minimum generation of deleterious gases from any of the component parts of the combustible. It will be observed that when this cartridge is used in conjunction with a system, such as that illustrated in Fig. 1, the point at which the cartridge is ignited is spaced from the point at which the work is done, so that there is an appreciable interval between the time of ignition and the time that the gases reach the combustion chamber and perform their work therein, and I have found that this yields most important results, in that, during this interval (of approximately one-half second) a complete chemical reaction takes place.

The nitrocellulose grains, of which the main body of the fuel in the shell is composed, contains carbon, hydrogen, nitrogen and oxygen, and the products of the composition are essentially carbon dioxide, carbon monoxide, water, hydrogen and nitrogen. I have found by actual test that the burning of a charge of approximately twelve grams of the fuel described, when burning under the conditions described, produces approximately one standard teaspoonful of water. Any water evolved during the burning of the charge, as described, is, as the temperature increases, converted into superheated steam which acts in conjunction with the generated gases to yield a great volume of continually expanding pressure fluid which acts upon the part to be moved (in this case a piston) with a pushing and cushioning action so that work done is done without shock or jar and with no semblance of explosive effect. The presence of this steam further aids in slowing up the burning of the fuel and this too aids in the production of this cushioned pushing effect. When the fuel in the shell, and especially in the form of shell illustrated in Fig. 2, is ignited, the pressure builds up in the shell until it becomes sufficient to dislodge the cap 25, then, when this cap finally yields, the gas and part of the fuel are blown suddenly into the tube 21. The sudden discharge of the body of pellets into this relatively cold tube has a tendency to blow out the pellets which have been ignited. By making my fuel charge to consist of elements of varying degrees of inflammability, I am able to utilize the elements of the greater degree of inflammability to maintain the ignition of the elements of a lesser degree of inflammability even under the somewhat adverse conditions which exist when the fuel is blown suddenly from the shell into the tube. This maintenance of ignition may be achieved as hereinafter described by making some of the pellets of nitrocellulose of a greater degree of inflammability than others, or may be achieved by making some portions of the charge of a different chemical composition than others.

I am aware of the fact that under certain conditions of aeration and confinement nitrocellulose pelleted fuels may be made relatively highly explosive. By the term non-explosive as used in this specification and claims, I mean that the fuel is of such a nature as to size of pellets, degree of aeration and degree of confinement in the cartridge and under the conditions of use, that the charge while burning very fast does not burn fast enough to be termed explosive in the sense that it delivers a sharp blow upon the part to be moved but is rather of such nature as to apply the fo[rce] with a pushing rather than a hammer blow e[f]fect. Nitrocellulose fuels when used as char[ge] in large guns, for example, are required to i[m]part to a projectile a speed of 4000 feet per se[c]ond, or more, within the length of the gun barr[el] while under the conditions of use of the prese[nt] invention, a speed of from one foot to three f[eet] per second of the part to be moved is all that required. By difficultly ignitible as used in t[he] claims, I mean to define a fuel not ignitible by ordinary spark, and even difficult to ignite fr[om] the heat of a lighted cigarette when directly a[p]plied, and one which will not ignite from an or[di]nary shot gun shell percussion cap.

I wish to emphasize the fact that the acti[on] secured by this pressure creating unit is ve[ry] different from that which takes place in proje[c]tiles fired by explosives. In those cases, the v[e]locity attained reaches thousands of feet per se[c]ond, whereas by the careful selection of the fu[el] and the novel manner of combining it, herein s[et] forth and described, I have been able, throu[gh] the medium of a self-contained ignitible unit, move a piston doing useful work, as slow fifteen feet per minute.

I am aware of the fact that it has heretofo[re] been proposed to start internal combustion e[n]gines by means of explosives, and many of t[he] devices proposed for this purpose contempla[te] the direct discharge of explosives into the cy[l]inders of such engines.

The present invention is not to be confus[ed] with devices of this nature. It will be read[ily] appreciated that the shock and jar imparted the engine mechanisms under such methods those referred to would not be considered pe[r]missible under present day practice. It is cle[ar] that the sudden jerk imparted to an engi[ne] crank shaft by such methods as those, wou[ld] tend to damage the bearings, destroy the ke[y] between the balance wheel and engine sha[ft] and otherwise injure and strain the engi[ne] parts. Further, it is clear that the firing an explosive charge into the cylinder of a co[m]bustion engine chamber, if the engine happen[s] to be on top dead center, would be likely blow off the cylinder head. The only way which that could be guarded against would to provide complicated and expensive apparat[us] for timing the explosive charge with the engi[ne] or by providing means to indicate to the oper[a]tor the position of the piston in the cylinder.

Further, the cylinders of internal combusti[on] engines are not constructed to withstand t[he] acid gases generated by the common types explosives and igniters, and it would be high[ly] undesirable to leave the residue from such e[x]plosive charges in such cylinders. Further, su[ch] acid gases are likely to cause gelatinization the lubricant used in such engines.

Figure 11:
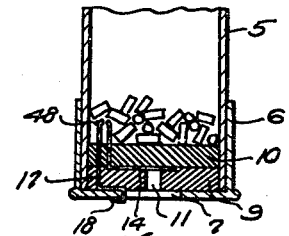
Figures 11, 12, 13, 14 and 15 are fragmentary vertical sectional views showing the base portion of further modifications, as hereinafter described.
Figure 13:
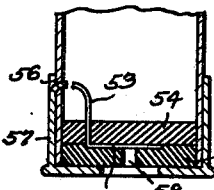

Under the method herein described I not on[ly] generate a large volume of a gas which expan[ds] relatively slowly and continuously over a co[n]siderable period, but I apply the power so ge[n]erated to the starting of internal combustion e[n]gines without permitting any of said gases to e[n]ter the engine. For example, the cylinder in Fig. 1 corresponds to the cylinder of t[he] starter shown in my copending application abo[ve] referred to and it is apparent that a starter this type is of general application and suscept[i]ble of being used upon even such types of e[n]gines as the relatively slow moving Diesel e[n]gines.

ttention is directed to the fact that the con- strip 14 is at the bottom of a recess into ch a pin 8 must be projected in order to plete the circuit. This is a safety factor of ortance in that the accidental contact of this ) with a stray source of electro-motive force 1arded against.

is further to be noted that the metallic )s forming leads to the match head com- tion as shown in Figures 2, 6, 9, and 14, the lead wires constituting the jump spark ces, as shown in Figures 11 and 13, are et from the safety aperture in the disc 9, ; more effectively preventing possibility of gas leakage from the shell through said ture.

1 the form of the invention illustrated in Fig. 1e elements are largely the same as those dis- ed in Fig. 2, except that in this case the ule 7a carries a primer cap 7b of a nature gnite a pellet 28 of some easily ignitible sub- ce, and which pellet in turn is of a nature gnite the grains of the main charge, in- ted at X. The pellet 28 constitutes an in- 1ediate charge and may be anchored to the washer 10b in such manner as to be placed osition therewith. However, I wish to make ear, with respect to this intermediate charge, the invention is not limited thereto because charge might consist of loose grains of k powder or fine grains of nitrocellulose or other suitable substance or composition oted to be ignited by the spit of a primer and to in turn set fire to at least some of grains of the main charge X.

he pellet 28 may advantageously consist of .ssium dichromate or chromate in compo- n with charcoal, tetryl, or ammonium pic- or T.N.T. or other combinations. This et may be coated with a composition of cu- icetelide or fine black powder or other com- tion to help ignite the pellet; the hot flame luced by said pellet serving to ignite some he grains of the main charge without im- ing shock or jar to such grains.

is well known that fuels of the character of e described as my main charge will, while 1ing and progressively generating gases, under ain pressures, tend to explode under high sures, and it is therefore of importance to ·d against the sudden building up of such i pressures. In some of the systems which e been proposed, barriers have been inter- d between the point of generation of the s and their point of use. Sometimes these iers have taken the form of valves theoreti- ; supposed to open to permit the passage he gases. However, it has been found that inertia of these valves is such as to cause building up of pressures far in excess of those h would be created if such barriers were not ent.

1erefore, under my method of utilizing these s, I deliver them to the point of use through )pen passage whereby the creation of pres- s beyond those contemplated is guarded nst. In addition, I utilize this passage as a rvoir within which to build up a desired me of gas. However, it is to be understood this reservoir may include not only the th of the tube but the expansion chamber 20 such part of the cylinder 24 as may be left 1 when the piston is at its limit of movement ird the head of the cylinder.

is, of course, apparent that many ways may be resorted to of igniting the charge within the shell. It is common practice in the electric igni- tion of blasting caps and the like, to accomplish this result by heated bridge wires in direct con- tact with the charge; heated wires embedded in match head compositions; jump spark ignition, and the like, and I wish it to be understood that the invention includes any suitable way of ignit- ing the charge. For example, the bridge wire might be passed through one of the holes of one of the grains of nitrocellulose fuel or other com- position to directly ignite the same without inter- position of a match head. Such arrangement as this is illustrated in Fig. 5, where 16a designates the bridge wire, and X' designates the grain of fuel.

Figure 1:
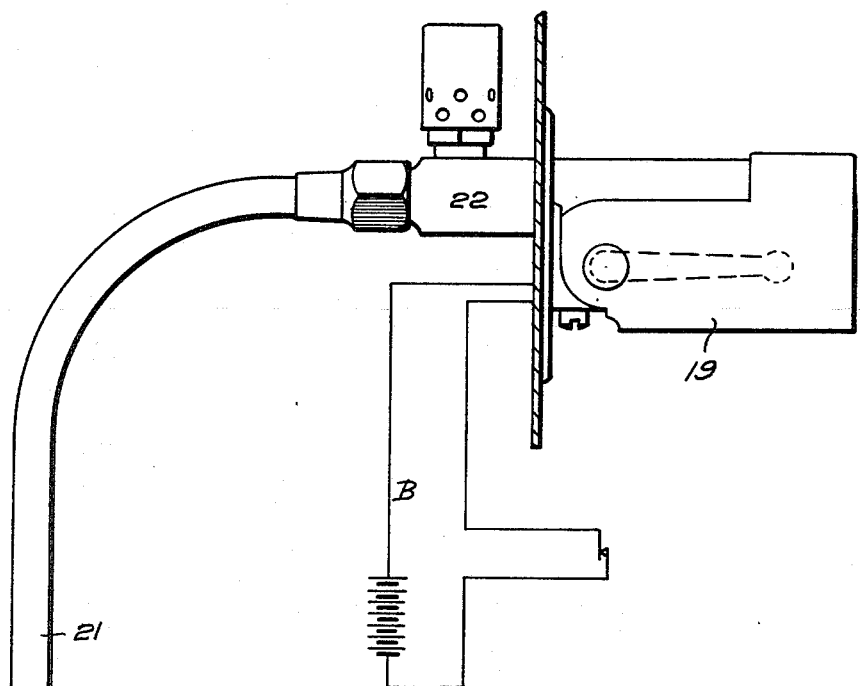
Figure 1 is a diagrammatic elevational view of a portion of the assembly disclosed in my aforesaid application illustrating the cartridge receiving breech block, expansion chamber and cylinder, and the connecting unit therebetween with certain of the parts broken away and shown in section.
Figure 1:
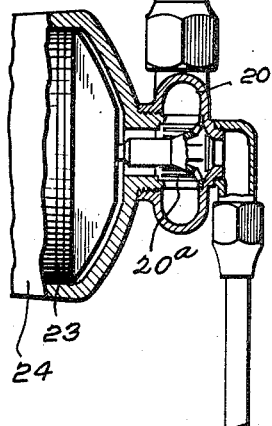
Figure 1:
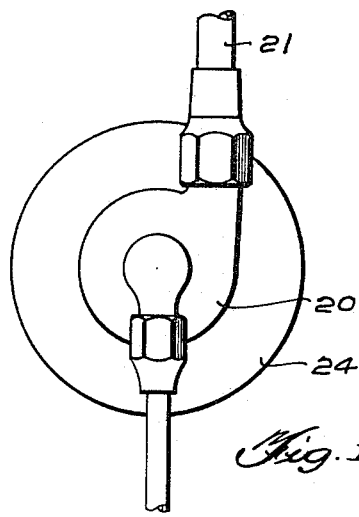
Figure 6:
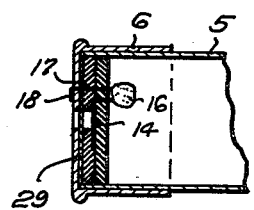
Fig. 6 is a fragmentary vertical sectional view of a modified form illustrating a protective web hereinafter described.

In the form of invention illustrated in Fig. 6, the structure is the same as that recited in Fig. 1 except that here a protective web 29 of a suitable waterproof and frangible material, such as oiled paper, very thin nitrocellulose film, or otherwise, is disposed between the lower disk 9 and the bot- tom of the ferrule to serve as a protecting medi- um for the contact strip 14 to prevent dirt, mois- ture, or the like from entering the depression and coming into contact with said strip. It is apparent that this strip may be easily punctured by the contact pin 8 or otherwise removed, at the time it is desired to use the shell.

Figure 5:
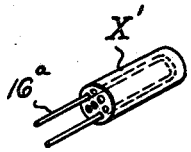
Fig. 5 is a perspective view of one of the grains of fuel hereinafter described.

It will be observed by referring to Fig. 5 that the grains of nitrocellulose have openings there- through. The number and size of these openings aid, among other things, in determining the speed of burning, and in practice I provide some grains with one number of holes and other grains with another number of holes, etc., to thereby control the rate of burning and consequently the rate of gas release and generation. However, this may be accomplished by varying the sizes of the grains, some smaller and some larger, with no holes. Instead of using granular fuel, I may use fuel in substantially solid form with such openings formed therein as may be neces- sary to get the desired rate of speed of burning.

Figure 7:
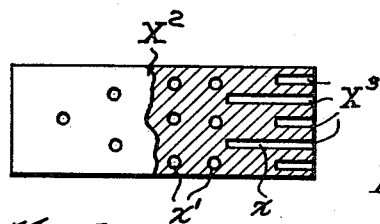
Fig. 7 is a view partly in side elevation and partly in section of a solid pellet of fuel hereinafter described.

In the form of invention illustrated in Fig. 7 the main fuel charge is illustrated as being in the form of a single pellet X2 having openings X3 formed therein of varying depth, number and size. These openings may be arranged longitudi- nally, as indicated at X or they may be arranged transversely, as indicated at $x'$.

Figure 10:
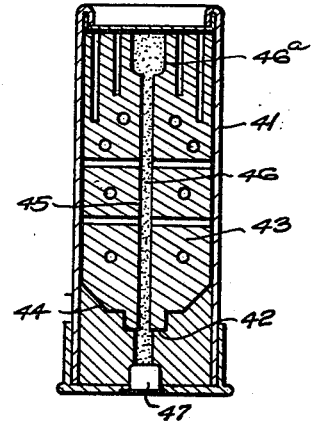

Fig. 1 of the present application corresponds to Figs. 10 and 11 of my copending application and like the construction there shown I employ some form of strainer in the fuel line to prevent undesirably large pieces of fuel or other matter from entering the cylinder. I have illustrated a cage or barrier comprising the spaced bars 20a in combustion chamber 20 but it is to be under- stood that the combined capacities of the spaces between said bars exceeds the capacity of the tube 21 itself so that the tube is, in effect, un- obstructed as far as the existence of any pres- sure creating barrier is concerned.

One of the important advantages of igniting the fuel at one point and conducting it to and burning it at another point is found in the case of airplane engine starters. For example, such a construction renders it possible to place a breech block in the cockpit or at any other point readily accessible to the pilot, and to deliver the hot gases to the starter which may be located at a point where it would be wholly inaccessible.

Many of the airplanes now in use employ what are termed "out-board" motors wherein the starting mechanism is housed within a protecting shell or casing. The described arrangement renders it possible to conduct the necessary gases to the starter without the necessity of removing such shell or otherwise having close access to the motor. However, despite the important advantages above recited, I wish to make it clear that I recognize the possibility of locating the cartridge at a point in close proximity to the cylinder of the starter motor and of discharging gases directly into said cylinder.

Figure 8:
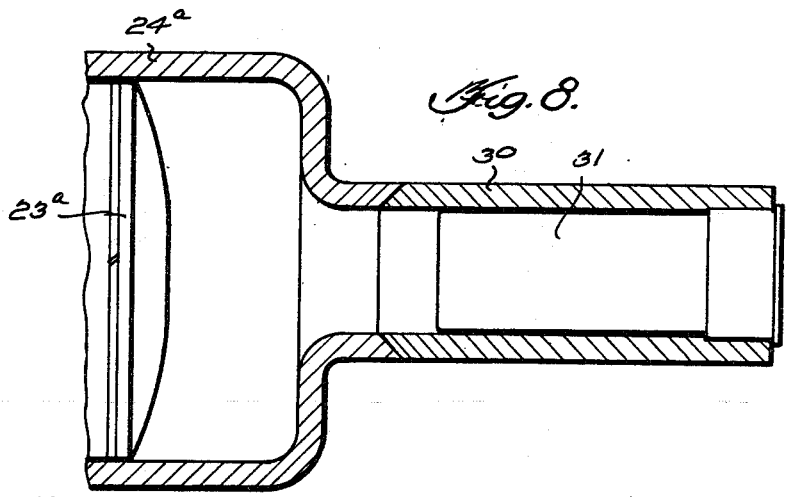
Fig. 8 is a diagrammatical sectional view of a different form of assembly illustrating a modified system hereinafter described.

In Fig. 8 I have illustrated such an arrangement where the cylinder 24a containing piston 23a (said members corresponding to the like members in Fig. 1) is directly connected to a breech chamber 30 containing a cartridge 31 which cartridge may correspond in construction to any of the cartridges hereinbefore or hereinafter described in this application or any cartridge functioning in like manner as the cartridges described herein.

When employing a cartridge disposed in such close proximity to the cylinder, I preferably leave somewhat more clearance between the cylinder head and piston than in the form shown in Fig. 1, and I aim to avoid undue shock and jar upon the piston by controlling the rate of combustion of the fuel of the cartridge. The solid pellet type of fuel illustrated in Figs. 7, 9 and 10 is particularly well adapted for use in this latter relation in that by suitably proportioning and locating the openings of the pellet, almost any rate of burning desired, can be had.

Figure 9:
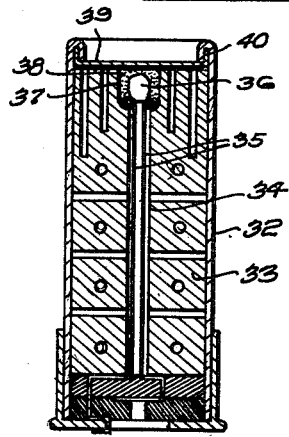

In Fig. 9, 32 designates a properly sized shell of approximately the size and character of a conventional shotgun shell. This shell receives a solid pellet 33 which is centrally cored, at 34, for the passage of the lead wires 35 of an electric match head 36. This match head is disposed in the forward or outer end of the pellet and lies in a recess 37. This recess is adapted to receive a body of powder 38 of a much more readily ignitible and sensitive nature than the material of the pellet 33. The pellet 33, for example, may be made of nitrocellulose or smokeless powder composition suitably cored or perforated to control the rate of combustion, while the composition 38 may be composed of a suitable deflagrating composition which is not so sensitive as the match head composition but is adapted to be ignited by the match head composition and to burn with a hot flame for such length of time as to, in turn, ignite the material of the pellet 33.

Such a composition may be composed of a nitroaromatic compound such as tetryl or ammonium picrate as fuel together with a chromate or dichromate as an oxidizer. The flash composition 38 may be in either powder, paste, fibrous or solid form; for example, gun cotton may be used, and there may be a sealing disc 39 placed thereover and crimped in place, as at 40, said disc being of the nature of that indicated at 25 in Fig. 2. That is to say said disc will be of a nature to be consumed along with the remainder of the fuel without objectionable ash or smoke, and will be of a nature to yield at least some oxygen during its combustion.

In the form of invention illustrated in Fig. 10, a shell 41 is provided with a base recess 42 and the inner end of the combustible pellet 43 is shaped to conform and fit within said recess and may be cemented therein by a coating of nitrocellulose cement 44 or anchored to the cartridge case in any other obvious manner. In this form of the invention, the pellet 43 is cored, at 45, to receive a combustible hot flame producing powder or other suitable material 46, adapted to be ignited without detonation by a primer cap 47. When the cap is fired in a conventional way, the powder train 46 is ignited and in turn sets fire to the interior of the pellet 43 and particularly to the interior of said pellet adjacent the outer end thereof. This is accomplished by enlarging the bore, as indicated at 46a, with the result that the pellet is completely ignited at its forward end and there is no tendency for any back pressure to be generated. That is to say, the greatest pressure is generated first at the forward end of the shell so that there will be no tendency for this pressure to blow the pellet out of the shell. One of the important advantages of this type of shell is that it may be used without a strainer and yet in close proximity to the cylinder, because there are no loose particles to be discharged into the cylinder. A further advantage is that if the fuel should be ignited and partly burned and then go out, the withdrawal of the shell brings all residue with it and leaves no fuel in the system which may be ignited upon a succeeding operation to generate excessive and dangerous pressure.

In Fig. 11 I have illustrated a modified form of the invention which is very similar to that illustrated in Fig. 2, and the same reference characters have been applied, insofar as they are applicable. The only difference is that instead of using a match head composition, I create an electric jump spark, at 48, for the ignition of whatever type of charge I may see fit to place therein, as for example tetryl.

Figure 12:
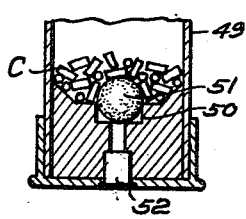

In the form of invention illustrated in Fig. 12, the shell 49 is provided with a recessed base having the cavity 50 in which a pellet 51 of a sensitive and deflagrating nature, like that described with respect to the material 38, in Fig. 9, may be dropped and held in place by the placing of the grains of fuel C thereupon. This pellet may be coated with cuprous acetylide and may be ignited by a primer cap 52 or by a match head, like that illustrated at 16, in Fig. 6, if desired.

It will be observed that this arrangement aids in protecting the fuel C from any detonation caused by the primer cap 52; the primer cap functioning to ignite the pellet and the pellet in turn igniting the fuel C.

In the form of invention illustrated in Fig. 13, I have illustrated an arrangement wherein a contact wire 53 is secured in place between two washers 54 and 55 of insulating material which may correspond to the washers 9 and 10 in Fig. 2 so that the mere placing of these washers in the shell properly positions this wire 53 and this wire lies in proximity to an extension 56 of the metallic ferrule 57. Thus, when a contact pin enters the opening 58 to contact with the base 59 of wire 53 in the manner described with respect to the like parts in Fig. 2, a spark will be caused to jump from the wire to the ferrule to bring about the ignition of the charge in the shell.

Figure 14:

In the form of invention illustrated in Fig. 14, the parts are like those illustrated in Fig. 2 and the same reference characters have been applied insofar as they are applicable. However, in this case the two terminals 15a and 17a are not connected by a bridge wire, but the ends of these elements are brought into proximity with each other and dipped into a match head composition 16a; the tendency of the spark to bridge the gap between these terminals serving to ignite the match head composition.

Figure 15:
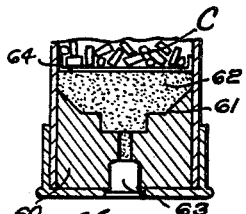

In the form of the invention illustrated in Fig. 15 the base of the shell is filled with a paper or pulp member 60 of a well known and conventional form commonly employed in shotgun shells and having a conical recess 61 formed therein. A body of deflagrating powder 62 of a flame producing nature is disposed in said recess and is adapted to be ignited by a primer cap 63 or by a match head, if the latter is preferred. This powder is covered by a web 64 of nitrocellulose film or other suitable readily ignitible and inflammable material like the corresponding element 25 of Fig. 2, and then the main body of burnable fuel C is placed in the shell and held therein in any desired way, as for instance the deck loading illustrated in Fig. 15.

Figure 16:
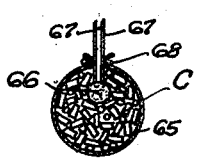
Fig. 16 is a vertical sectional view of a further modification wherein the granular fuel is placed in a differently shaped form of container as will be hereinafter described.

In the form of the invention illustrated in Fig. 16, I have illustrated an arrangement wherein the granular burnable fuel C is placed in a small bag 65. This bag may be made of silk, rayon, or nitrocellulose film composition which will burn without ash and aid in the generation of the gases along with the gases of the fuel. A match head composition 66 carried by the lead wires 67 may be placed in the bag and the whole may be tied, as indicated at 68. This structure if placed in a suitable confining receptacle may be used to deliver gases for work performing, power producing purposes.

From the many illustrations given it will be apparent that there are almost numberless ways which will suggest themselves to those skilled in the art for accomplishing the desired result. Therefore, I wish it to be clearly understood that my invention is not limited to any particular way of accomplishing this result, but resides in the broad conception of the thought of producing and delivering gases of this nature from a readily portable self-contained power generating unit in the controllable manner described in this application and especially when the power so produced is delivered in such fashion as to successively act upon a moving part for the repeated performance of useful work.

The igniting and fuel compositions employed herein are of particular advantage when used in the production of gases which are to be delivered upon metallic surfaces which must stand up for the performance of repeated operations. One of the respects in which these compositions are of particular utility in this relation is that they are free from chlorine in any form. I have found by actual tests that the use of compositions containing chlorine corrodes metals and that they would be highly objectionable for purposes of this sort. The presence of chlorine would not be objectionable in explosives, for example, which are used only once and are destroyed in use, but it will be seen that the conditions existing in the present case are of a wholly different nature in that the mechanisms upon which the gases are going to act are of quite an expensive nature and must be used over and over again for the performance of work of a delicate nature. That is to say that they perform work under conditions where failure to operate can not be tolerated. For example, these mechanisms are intended for use and indeed have an exceedingly important use in starter mechanisms for military airplanes where certainty of operation becomes a matter of life and death.

Further, in airplane engine starters the question of weight is of vital importance and the starter parts must be of relatively light weight with correspondingly thin walls and sections. Under these conditions the very smallest degree of deterioration becomes fatally objectionable.

While the nitrocellulose fuels herein shown and described have been found to be highly suitable for my purposes and which fuels may comprise straight nitrocellulose base smokeless powder as used by the United States Army, I contemplate the employment of any suitable burnable, low ash or no ash fuels, among them the following:

Nitrocellulose-nitroglycerine types of smokeless powder as instanced by the British cordite.

Flashless smokeless powder of the U. S. Flashless Powder Co. which is nitrocellulose powder with a small admixture of black powder or of metallic nitrate or of metallic dichromate.

Various so-called non-hygroscopic smokeless powders, usually having TNT coating.

Smokeless powder whose burning rate is controlled by surface treatment with dinitrotoluene.

Also, these powders were and may be of various shapes and sizes with various numbers of perforations.

In fact, fuels might conceivably be any burning explosive which does not leave very much solid residue. As non-nitrocellulose possibilities we might cite:

1. Wood pulp impregnated with ammonium nitrate.

2. Mixture of tetryl and ammonium nitrate.

3. Mixture of pentaerythrite-tentranitrate and ammonium nitrate.

4. Various combinations of the three items above with or without nitrocellulose and/or nitroglycerine.

The foregoing substances for purposes of brevity will be referred to in the claims generally as group A.

I contemplate incorporating in any of these shells described herein flake or powdered graphite so that where any of the fuel is carried over into the cylinder, it will carry the graphite with it as an element of lubrication for the moving parts. Or the graphite may be blown over into the cylinder by the action of the gases whether any of the fuel goes over into the cylinder or not.

Having described my invention, what I claim is:

1. A power generating unit of the character described comprising a shell, a body of granular material therein constituting a burnable non-explosive and deflagrating fuel, a bridge wire passing through one of the grains of said granular material, and means for completing a circuit through said bridge wire from the exterior of the shell.

2. In a power generating unit comprising a shell, a body of normally explosive fuels composed of a multiplicity of intermingled pellets some of which are faster burning than others and disposed therein with reference to each other so that when ignited without disturbing their explosive chemical equilibrium insure ignition thereof until consumed and combine to produce a large volume of highly heated controllable gas for the performance of useful work.

3. In a power generating unit, a shell containing a charge of deflagrating burnable fuel in such quantity to deliver, when ignited and burned, a sufficiently large volume of gas to perform an appreciable amount of useful work and wherein said fuel is composed of a multiplicity of pellets some of which are faster burning than others and adapted to aid in maintaining ignition and support combustion of the slower burning pellets, all of said pellets being so disposed with reference one to the other as to insure continued ignition of the charge until consumed, said fast burning pellets being easily ignitible but difficult to extinguish and capable after ignition of immediately producing volume and heat, and the slower burning pellets being difficult to ignite but when ignited and burned produce increased volume and continue to heat the gases formed over the period necessary to maintain the expansion of said gases, and a hot flash means within the shell for igniting said pellets.

4. In a power generating propulsive type cartridge, the combination with a container adapted to be charged into a breech block, a body of difficultly ignitible but easily extinguishable fuel therein comprising a body of nitrocellulose, an easily ignitible but difficultly extinguishable fuel of a deflagrating and non-detonating nature adapted to sustain a flame so as to ignite the nitrocellulose fuel and so disposed with reference thereto as to maintain ignition thereof until consumed, and an igniting means adapted to set off said easily ignitible but difficultly extinguishable fuel.

5. A structure as recited in claim 4 wherein the igniting means comprise jump spark mechanism.

6. A structure as recited in claim 4 wherein the container is in the nature of a shot gun shell with a metallic ferrule and wherein the igniting means comprises the jump spark mechanism of which the ferrule forms a part.

7. A structure as recited in claim 4 wherein the igniting means comprises a body of non-detonating hot flash composition disposed in proximity to said fuel and means for delivering heat to said composition.

8. A structure as recited in claim 4 wherein the igniting means comprises a body of non-detonating hot flash composition, and a jump spark mechanism for igniting the same.

9. A structure as recited in claim 4 wherein is provided electric means for igniting said fuel, said container comprising a metallic part, and the ignition means including a bridge wire, one side of which is grounded to said metallic part.

10. A power generating unit of the character described consisting of a shell comprising a conventional type of metallic ferrule closing its rear end and having a central opening therein, a body of insulating material in the body of said shell, an electrically igniting hot flash device within the shell, the terminal of one of the lead wires to said hot flash device being grounded to said ferrule and the terminal of the other lead wire being insulated by said insulating material from the said ferrule, said insulating material having an aperture formed therethrough to permit the entry of a contact element from the exterior of said shell, and said lead wires being offset from said aperture to prevent gas leakage, and a body of deflagrating non-explosive burnable material in said shell in such quantity as to deliver gases without explosion in such volume as to perform the amount of useful work for which said shell is intended.

11. In a power generating propulsive type cartridge, the combination with a container adapted to be charged into a breech block, a body of difficultly ignitible but easily extinguishable fuel therein comprising a body of nitrocellulose, an easily ignitible but difficultly extinguishable fuel of a deflagrating and non-detonating nature adapted to sustain a flame so as to ignite the nitrocellulose fuel and so disposed with reference to said nitrocellulose fuel as to insure continued ignition of the charge until consumed, and a igniting means adapted to set off said easily ignitable but difficultly extinguishable fuel.

12. In a power generating propulsive type cartridge, the combination with a container adapted to be charged into a breech block, a body of difficultly ignitable but easily extinguishable fuel therein comprising a body of nitrocellulose, a easily ignitable but difficultly extinguishable fuel of a deflagrating and non-detonating nature adapted to sustain a flame so as to ignite the nitrocellulose fuel and so disposed with reference to said nitrocellulose fuel as to insure continued ignition of the charge until consumed, said easily ignitable but difficultly extinguishable fuel capable after ignition of immediately producing volume and heat and the difficultly ignitable but easily extinguishable fuel producing increase volume and continuing the heat to maintain the expansion of the gases produced for the period necessary to perform an appreciable amount of useful work, and an igniting means adapted to set off said easily ignitable but difficultly extinguishable fuel.

13. In a power generating unit comprising shell, a body of normally explosive fuels composed of a multiplicity of intermingled pellets some of which are faster burning than others and disposed therein with reference to each other to permit ignition and burning without disturbing their explosive chemical equilibrium to produce controllable gas for the performance of useful work.

14. In a prime mover actuating system comprising a pressure actuated movable element, cartridge receiving chamber and an enclosed communicating expansion chamber between the said movable element and the cartridge receiving chamber, the volume of said expansion chamber being materially greater than the space occupied by the cartridge used; a projectile-free fuel cartridge containing a deflagrating fuel charge and so constructed that, when fired, at least a part of the deflagrating fuel charge contained in the cartridge will be expelled therefrom in a solid and incompletely consumed state, the said deflagrating fuel charge comprising colloided nitrocellulose and a quenchableness reducing means associated therewith of a nature to maintain the said fuel in the ignited state, as and when the said fuel is expelled from the fired cartridge into the said expansion chamber of the prime mover actuating system.

15. A propulsive type prime mover actuating cartridge comprising in combination, a substantially solid, difficultly ignitable deflagrating main fuel of a material of such nature that its rate of burning increases with increase of pressure, a primary igniter and an intermediate deflagrating fuel kindling element ignited by the igniter and in turn igniting said main charge, said kindling element being of such composition and amount as to act over a material period of time to ignite the difficultly ignitable main fuel while developing so little pressure as not to materially increase the rate of burning of the main charge in the prime mover system.

16. A propulsive type prime mover actuating cartridge comprising in combination, a substantially solid self-combustive low residue-forming deflagrating main fuel of such nature that its rate of burning increases with increase of pressure, and a deflagrating fuel kindling element of composition and amount as to ignite the said
fuel while developing gaseous products so
ually and in such small amount as not to
rially increase the rate of pressure developt of the said main fuel in the prime mover
m.

. A cartridge comprising a shell, a main body
anular fuel therein comprising colloided niellulose, and an electric match associated
the cartridge and with said main body of
and comprising a primary heat producing
ent, and a body of fuel kindling composition
orising at least one nitroaromatic body and at
one oxygen carrier taken from the group
isting of chromates and dichromates.

. A propellent fuel cartridge comprising a
ietically sealed shell, carrying a substantialolid, self-combustible, deflagrating fuel of
nature that its rate of burning increases
increase in pressure, igniting means for the
including flash composition, and means resive to the combustion of the flash compo-
a and independent of the heat and pressure
rated by the fuel for venting the cartridge at
from the moment the fuel is ignited.

. A propellent fuel cartridge comprising a
, a body of substantially solid deflagrating
in said shell and igniting means for the fuel
iding a flash composition of a much greater
ee of combustibility than the said fuel and a
ire for the shell responsive to the ignition of
flash composition and independent of the
sure generated by the said fuel for venting
cartridge from the moment that the fuel is
ed.

. A propulsive type of prime mover actuating cartridge comprising in combination a body of main fuel comprising a plurality of colloided nitrocellulose pellets, a primary igniter and an intermediate deflagrating preformed match composition ignited by the igniter and in turn igniting said nitrocellulose pellets said preformed match being of such composition and amount as to act over a material period of time to ignite the difficultly ignitable nitrocellulose pellets while developing so little pressure as not to materially increase the rate of burning of the nitrocellulose pellets in the prime mover system.

21. In a prime mover actuating system comprising a pressure actuated movable element, a cartridge receiving chamber and an enclosed communicating expansion chamber between the said movable element and the cartridge receiving chamber, the volume of said expansion chamber being materially greater than the space occupied by the cartridge used; a projectile-free fuel cartridge containing a deflagrating fuel charge and so constructed that, when fired, at least a part of the deflagrating fuel charge contained in the cartridge will be expelled therefrom in a solid and incompletely consumed state, the said deflagrating fuel charge comprising colloided nitrocellulose, in the form of grains with a quenchableness reducing means incorporated therein, said quenchableness reducing means being of a nature to maintain the said fuel charge in the ignited state, as and when the said fuel is expelled from the fired cartridge into the said expansion chamber of the prime mover actuating system.

ROSCOE A. COFFMAN.